United States Patent
Moughabghab et al.

(10) Patent No.: US 7,400,675 B2
(45) Date of Patent: Jul. 15, 2008

(54) SYSTEM AND METHOD FOR DIGITAL ADAPTIVE EQUALIZATION WITH FAILURE DETECTION AND RECOVERY

(75) Inventors: Raed Moughabghab, Laguna Niguel, CA (US); De Jun Wang, Irvine, CA (US); Fang Xu, Irvine, CA (US); Najwa Moughabghab, Laguna Niguel, CA (US)

(73) Assignee: Mindspeed Technologies, Inc., Newport Beach, CA (US)

( * ) Notice: Subject to any disclaimer, the term of this patent is extended or adjusted under 35 U.S.C. 154(b) by 746 days.

(21) Appl. No.: 10/929,054

(22) Filed: Aug. 27, 2004

(65) Prior Publication Data

US 2006/0045176 A1   Mar. 2, 2006

(51) Int. Cl.
   *H03H 7/40*   (2006.01)
(52) U.S. Cl. ...................................................... 375/232
(58) Field of Classification Search ................. 375/232, 375/316
   See application file for complete search history.

(56) References Cited

U.S. PATENT DOCUMENTS

| | | | | |
|---|---|---|---|---|
| 5,796,778 A | * | 8/1998 | Kurker | 375/229 |
| 5,987,065 A | * | 11/1999 | Candage | 375/232 |
| 6,118,833 A | * | 9/2000 | Bergmans et al. | 375/366 |
| 6,242,961 B1 | * | 6/2001 | Liu et al. | 327/307 |
| 6,363,111 B1 | * | 3/2002 | Hee et al. | 375/224 |
| 6,975,678 B1 | * | 12/2005 | Le et al. | 375/232 |
| 7,065,133 B1 | * | 6/2006 | Phanse et al. | 375/219 |
| 7,248,635 B1 | * | 7/2007 | Arneson et al. | 375/257 |

* cited by examiner

*Primary Examiner*—Dac V Ha
(74) *Attorney, Agent, or Firm*—Michael A. Rahman; Gardere Wynne Sewell LLP

(57) ABSTRACT

An adaptive equalization method and system for automatically adjusting an equalizer to compensate a signal's frequency dependent loss is disclosed. The method comprises setting the equalizer's initial coefficient value, receiving an equalized signal, identifying a positive to zero transition of the equalized signal, generating a common mode voltage from the equalized signal, and determining the equalized signal's tail settling voltage. The method further comprises comparing the equalized signal's tail settling voltage to the common mode voltage, determining if the signal is over equalized or under equalized based on the comparison, and adjusting the equalizer's coefficient value based on whether the signal is under equalized or over equalized.

10 Claims, 9 Drawing Sheets

SYSTEM AND METHOD FOR DIGITAL ADAPTIVE EQUALIZATION WITH FAILURE DETECTION AND RECOVERY

TECHNICAL FIELD

The present invention relates generally to digital communications, and more specifically to a system and method for digital adaptive equalization with failure detection and recovery.

BACKGROUND OF THE INVENTION

In communication systems, data (or signal) is transferred over a physical media such as, for example, twisted pair wire, coaxial cable, or optical fiber. These physical media are non-ideal communication channel, which degrades the signal by causing attenuation and delay. The physical media further degrades the signal by adding noise and distortion to the signal.

FIGS. 1 and 2 illustrate a typical transmitter and a receiver, respectively, of a wireline communication system. The blocks in the transmitter 100 and receiver 200 are connected differentially as indicated by the double lines. Referring now to FIG. 1, a transmitter 100 includes a jitter attenuator ("JA") 104, a digital encoder ("encoder") 108, a phase locked loop ("PLL") 112, a trapezoidal pulse generator ("TPG") 116, a line driver ("LD") 120, and a cable 124. In the following description, the physical media will be referred to as the cable.

In operation, a clock signal and data is provided to the JA 104. The JA 104 removes unwanted jitter from the clock signal, and synchronizes the data and the clock signal. The JA 104 provides the data to the encoder 108. The encoder 108 encodes the data according to a standard coding scheme.

The JA 104 provides the clock signal to the PLL 112. The PLL 112 multiplies the clock signal to generate a higher frequency clock signal in order to meet the over-sampling requirement of the TPG. In this case, the PLL 112 multiplies the clock signal by 4, i.e., multiplies the clock frequency by 4. The higher frequency clock signal is received by the TPG. The TPG 116 also receives the encoded data from the encoder 108.

The TPG 116 converts the digital signal into an analog signal that is suitable for transmission. The output of the trapezoidal pulse generator 116 is received by a line driver 120. The line driv& 120 drives the resistive load of a media 124 such as a coaxial cable. In other words, the line driver transmits the analog signal over the coaxial cable 124.

Referring now to FIG. 2, a receiver 200 includes a variable gain aniplifer (VGA) 204, an equalizer 208, a peak detector (PD) 216, a slicer 240, an analog offset controller (AOC) 212, a clock and data recovery circuit (CDR) 220, an automatic equalizer controller (AEC) 224, an analog gain controller (AGC) 228, and a digital decoder 232.

The signal transmitted over a cable 202 is received by the receiver 200. The VGA 204 amplifies the signal to compensate for the frequency-independent loss, also known as resistive loss or flat loss.

The output of the VGA 204 is received by the equalizer 208. The equalizer 208 compensates for the frequency-dependent loss on the cable also known as cable loss. The equalizer 208 boosts the high frequency components of the signal to compensate for the cable loss.

The output of the equalizer 208 is received by the PD 216. In general, the PD 216, which receives an analog output from the equalizer 208, determines the peak of the equalized signal. The output of the equalizer 208 is also received by the AOC 212, which controls through the VGA 204 the differential offset of the receiver. Thus, the AOC 212 forms a feedback loop to adjust through the VGA 204 the differential offset of the receiver, driving the differential offset to 0V level. The differential offset of the receiver is driven to a 0V level in order to eliminate harmonic distortion inside the receiver 200.

As discussed before, the output of the equalizer 208 is received by the PD 216. The peak detector determines the peak of the equalized signal (i.e., the output of the equalizer 208) and sends the peak value to the slicer 240. The slicer 240 also receives the output of the equalizer 208. The slicer 240 functions as an analog to digital converter (e.g., a 2 bit A/D converter), which outputs a digital signal using the peak value.

The digital output of the slicer 240 is received by the CDR 220. The CDR 220 extracts the correct clock signal and data from the digital signal and also synchronizes the data and the clock signal. The output of the CDR 220 is received by the decoder 232, which decodes the signal according to a standard decoding scheme.

The analog output of the PD 216 is received by the AGC 228, which controls the gain of the VGA 204. The digital output of the slicer 240 and the output of the CDR 220 are received by the AEC 224, which controls the gain of the equalizer 208 by adjusting the equalizer coefficients or steps.

A signal, such as, for example, a digital signal (i.e., data) can be decomposed into a set of sinusoidal waves according to the Fourier theorem, each sinusoidal wave having a different frequency and amplitude. As discussed before, when a signal such as a sinusoidal wave travels over a cable, which is a non-ideal communication channel, it suffers from attenuation. The attenuation refers to the loss or decrease in amplitude of the signal. The sinusoidal wave is also subjected to a delay when traveling through the cable. The delay varies depending on the frequencies. Thus, the sinusoidal waves that form a digital signal will each be delayed by a varying degree. In general, the sinusoidal wave's attenuation and delay is directly proportional to the transmission distance. Thus, the longer the sinusoidal wave travels, the more attenuation and delay it suffers.

FIG. 3 illustrates the attenuation and delay of a square wave that travels through a 100 feet cable and a 1000 feet cable, respectively. As shown in FIG. 3, the square wave's attenuation and delay increase as the wave travels longer distance.

A signal traveling through a cable is subjected to two types of loss: (a) cable loss; and (b) flat loss. A flat loss causes all frequencies of the signal to be attenuated by the same level. A cable loss causes different levels of attenuation to different frequencies. In general, a cable causes higher level of attenuation to high frequency signals and lower levels of attenuation to low frequency signals. Thus, when a square wave travels through a cable, its higher frequencies are attenuated more than lower frequencies. The cable also adds noise and distortion to the signal, which causes degradation of the signal.

In general, the receiver 200 (also known as an analog front end receiver) is relied upon to restore transmitted signals after they travel through the cable. As shown in FIG. 2, the receiver 200 provides analog gain compensation, equalization and filtering. The equalizer 208 compensates for the frequency-dependent loss on the cable. The equalizer 208 is a combination of several blocks, each block having a low pass filter and an adjustable zero. The low pass filter is implemented with a fixed pole. In a typical equalizer, an all 0 code corresponds to a scenario when the pole and zero of each block are aligned and their individual effects are cancelled. When the equalizer coefficient is increased, the zero location moves towards lower frequency, resulting in a high pass function. The purpose of the equalizer is to create a high-pass function that is inverse of the low pass function of the cable, so that the combined frequency response of the cable and the equalizer is 0 dB (i.e., flat).

Ideal Equalization

FIGS. 4(a) and 4(b) illustrate an ideal equalization scheme, which restores a signal to its original state. In FIG. 4(a), the signal originates from a transmitter 404, travels through a cable 408, and is received by a receiver 412. The signal is subjected to cable loss as it travels through the cable 408. FIG. 4(a) shows that the original waveform is attenuated due to cable loss and is then restored or equalized by an equalizer inside the receiver 412.

FIG. 4(b) illustrates the cable loss characteristics, the equalization frequency response, and the overall transfer function. The cable loss characteristics indicate attenuation of the high frequency components of the signal due to the low pass characteristics. The equalizer is adjusted so that the high frequency components of the signal are amplified, thereby canceling the cable loss effect and restoring the signal to its original state. The overall transfer function after the equalization is the 0 dB line.

In reality, however, the equalizer doesn't completely cancel the effect of the cable loss on a signal. The equalizer either under equalizes or over equalizes.

Under Equalization

If the equalizer's high frequency boost is inadequate to cancel the loss caused by the cable, the resulting signal will be under equalized. An under equalized signal is not fully restored to its original form. FIGS. 5(a) and 5(b) illustrate an under equalization scenario. In FIG. 5(a), a signal originating from a transmitter 504 travels over a cable 508 and is subjected to cable loss. The cable loss causes attenuation of the high frequency contents of the signal. An equalizer inside the receiver 512 attempts to restore the signal to its original shape. However, as shown in FIG. 5(a), the equalizer's high frequency boost is inadequate to restore the attenuation due to the cable loss. Thus the signal after equalization is under equalized. FIG. 5(b) shows the equalization frequency response, cable loss characteristics and overall transfer function. Due to inadequate equalization, the transfer function indicates that the high frequency components are not completely restored.

Over-Equalization

If the equalizer provides more high frequency boost than necessary to cancel the cable loss, the resulting signal is over equalized. An over equalized signal contains ringing. FIGS. 6(a) and 6(b) illustrate an over equalization scenario.

In FIG. 6(a), a signal originating from a transmitter 604 travels over a cable 608 and is subjected to cable loss. The cable loss causes attenuation of the high frequency contents of the signal. An equalizer inside a receiver 612 attempts to restore the signal to its original shape. However, as shown in FIG. 6(a), the equalizer provides excess high frequency boost, which causes a ringing waveform.

FIG. 6(b) shows the equalization frequency response, cable loss characteristics and overall transfer function. Due to excessive equalization, the transfer function indicates that the resulting signal includes excessive high frequency boost, thus resulting in a ringing waveform.

Both under equalized and over equalized signals are undesirable in communication systems. An over equalized signal causes error in a peak detector, resulting in bit errors. An under equalized signal causes inter-symbol-interference (ISI). The problems caused by under equalization and over equalization will be discussed further below.

FIGS. 7(a)-7(c) illustrate the problems due to over equalization. In FIG. 7(a), the original waveform consists of 0, 1, 0, −1. FIG. 7(b) illustrates the resulting waveform after over equalization. As seen in FIG. 7(b), due to over equalization, the waveform contains significant ringing. FIG. 7(c) illustrates the waveform after being processed by a slicer. The output of the slicer is an incorrectly restored signal consisting of 1 0, 1, −1, 0, 1, −1, 0, −1, 1. Thus, the output of the slicer contains significant error.

FIGS. 8(a)-8(c) illustrate the problem due to under equalization. In FIG. 8(a), the original waveform consists of 0, 1, 0, −1. FIG. 8(b) illustrates the resulting waveform after under equalization. FIG. 8(c) illustrates the waveform after being processed by a slicer. The output of the slicer consists of 1 0, −1, 0. Thus, the output of the slicer contains significant error.

In general, two types of equalization schemes can be used to restore a signal: fixed equalization; and adaptive equalization.

In a fixed equalization, the equalizer compensates the signal with a predetermined constant or fixed boost of the signal's high frequency content. Although the fixed equalization scheme is simple and reliable, because the equalization is predetermined and fixed, this scheme is only suitable in one optimized situation. For example, if the equalizer is optimized for a 500 feet cable, then for all other situations, the equalizer is sub-optimal, i.e., over equalized or under equalized. Thus, the equalizer optimized for a 500 feet cable is over equalized for a cable length less than 500 feet, and is under equalized for a cable length greater than 500 feet.

In an adaptive equalization, the amount of equalization is determined dynamically rather than being predetermined and fixed. The adaptive equalization scheme utilizes a nonlinear algorithm wherein the equalizer continuously monitors a channel characteristics or behavior and tries to cancel the cable loss with an optimal equalization. If the channel characteristics change, the equalizer adapts to the new channel characteristic by adjusting the amount of equalization, and restores the signal correctly.

However, adaptive equalization scheme suffers from a disadvantage common to all non-linear algorithms. The adaptive equalizer can be trapped in a failure state (i.e., incorrect state) and not able to recover from the failure state. If the adaptive equalizer is trapped in a failure state, the equalization will be under equalized or over equalized, thus resulting in errors.

For example, if the equalizer is over equalized thus causing the CDR 220 to lose lock, the clock signal supplied by the CDR 220 will have incorrect timing. The incorrect timing causes incorrect sampling of the signal, resulting in false information regarding the signal. If the sampling behavior incorrectly indicates that the waveform is under equalized when in reality it is over equalized, the equalizer's coefficient is increased until it reaches a maximum, causing the adaptive equalization to be trapped in an incorrect state.

Accordingly, there is a need for an adaptive equalization scheme that provides optimum level of equalization. There is a need for an adaptive equalization scheme that detects when the equalizer is trapped in a failure state. There is also a need for an adaptive equalization scheme that allows the equalizer to recover from the failure state.

SUMMARY OF THE INVENTION

The invention is directed to an adaptive equalization method and system for automatically adjusting an equalizer to compensate a signal's frequency dependent loss. In one embodiment of the invention, the method comprises setting the equalizer's initial coefficient value, receiving an equalized signal, identifying a positive to zero transition of the equalized signal, generating a common mode voltage from the equalized signal, and determining the equalized signal's tail settling voltage. The method further comprises comparing the equalized signal's tail settling voltage to the common mode voltage, determining if the signal is over equalized or under equalized based on the comparison; and adjusting the equalizer's coefficient value based on whether the signal is under equalized or over equalized.

The method further comprises comparing the equalized signal's tail settling voltage to the common mode voltage by a quantizer. The method further comprises determining the signal to be over equalized if: the signal transitions from positive to zero, there is no other transition in the next symbol period, and the output of the quantizer=0. The method further comprises determining the signal to be under equalized if: the signal transitions from positive to zero, there is no other transition in the next symbol period and the output of the quantizer=1. The method further comprises determining the signal to be over equalized if: the signal transitions from negative to zero, there is no other transition in the next symbol period and the output of the quantizer=1. The method further comprises determining the signal to be under equalized if: the signal transitions from negative to zero, there is no other transition in the next symbol period and the output of the quantizer=0.

DETAILED DESCRIPTION OF PREFERRED EMBODIMENTS

The invention is directed to an adaptive equalization system and method that provides optimum level of equalization. The invention detects when an equalizer is trapped in a failure state and allows an equalizer to recover from the failure state.

In one embodiment of the invention, a 1-bit quantizer compares an equalized signal's tail settling voltage to the common mode voltage derived from the equalized signal. The 1-bit quantizer is a sampled comparator that compares two voltages synchronous with a sampling clock. The sampling clock ensures that the 1-bit quantizer compares the equalized signal's tail settling voltage to the common mode voltage. The 1-bit quantizer outputs 1 or 0. The common mode voltage derived from the equalized signal is the mid voltage between a peak detector's most positive and most negative voltage, which corresponds to the signal's highest and lowest voltage.

In one embodiment of the invention, a positive to zero, (i.e., a "10") transition pattern of the signal first is searched before a determination is made whether the signal is over equalized or under equalized. Otherwise, the signal's settling voltage will be corrupted by the Inter Symbol Interference (ISI) of the next signal transition, which will cause the adaptive algorithm to fail. The ISI is caused by the cable loss effect, which causes the high frequency content of the signal to be attenuated, causing the signal energy from one data symbol to leak beyond its symbol period and corrupt adjacent data patterns. In contrast, if a "11" transition pattern is searched, the tail settling waveform of a previous symbol will be corrupted by the next symbol and the voltage tail will not settle.

Once the "10" transition is found, an algorithm is used to determine if the signal is under equalized or over equalized. As will be explained in detail later, based on the output of the 1-bit quantizer and the transition of the signal, an internal counter is incremented or decremented. The internal counter is incremented by 1 if the signal is under equalized and is decremented by 1 if the signal is over equalized. If the counter overflows, the equalizer coefficient is incremented by 1, and if the counter underflows, the equalizer coefficient is decremented by 1.

The output T of the 1-bit quantizer, which is 1 or 0, indicates how well the signal is equalized. The 1-bit quantizer is sampled by a clock derived from a CDR. The sampling edge is X1 time away from the falling edge of the data transition. The X1 time away from the falling edge of the data transmission is the time that is optimized for observing the settling behavior of the waveform after equalization. If X1 is too small, the waveform is still in transition and settling behavior cannot be observed easily. If X1 is too large, the waveform has mostly settled and the 1-bit quantizer can easily be influenced by noise and other channel non-ideal characteristics. In one embodiment, X1 is set at ⅛ of a symbol period.

Figure 1:
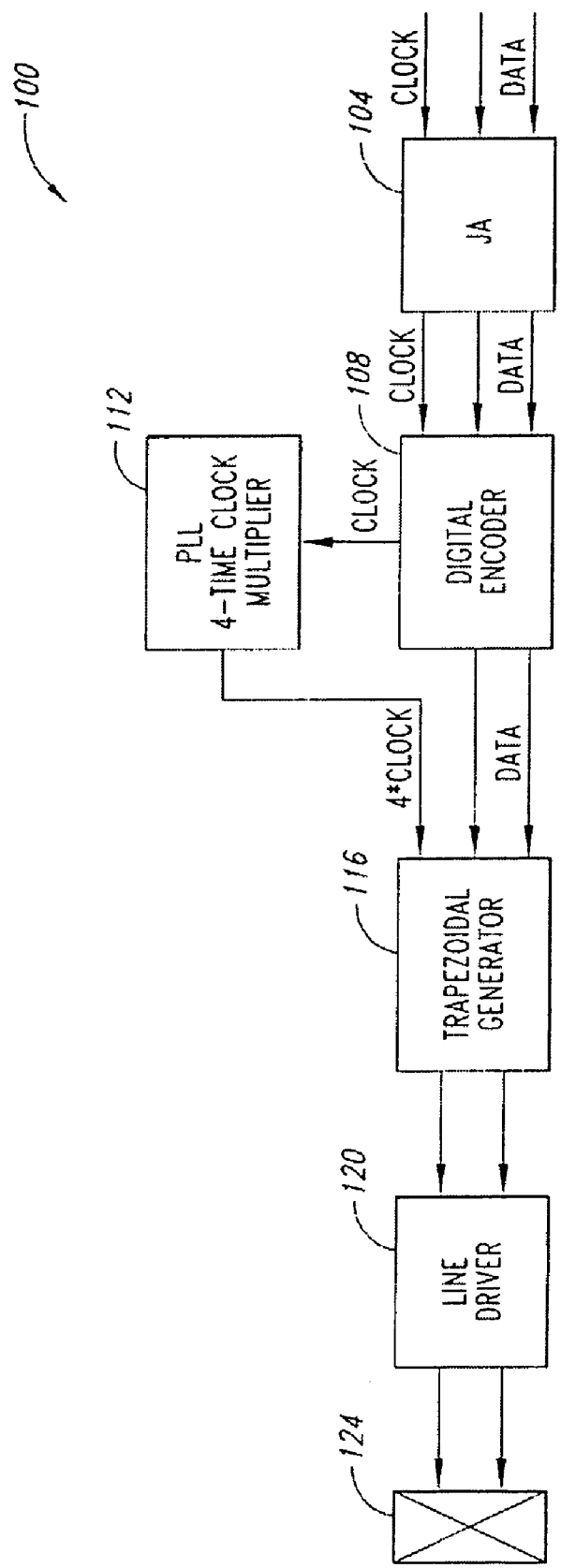
FIGS. 1 and 2 illustrate a typical communication systems including a transmitter and a receiver, respectively.
Figure 2:
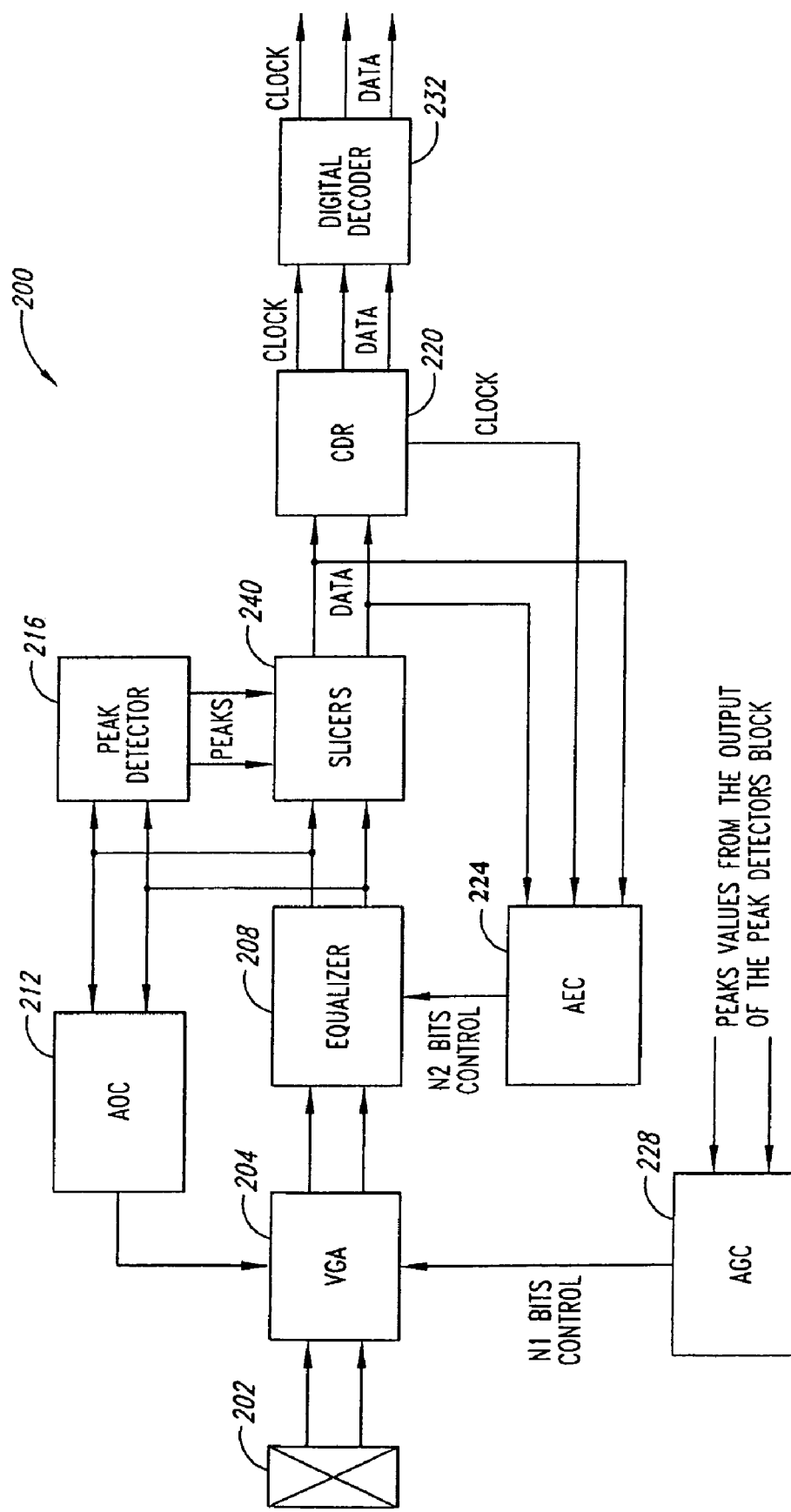
Figure 3:
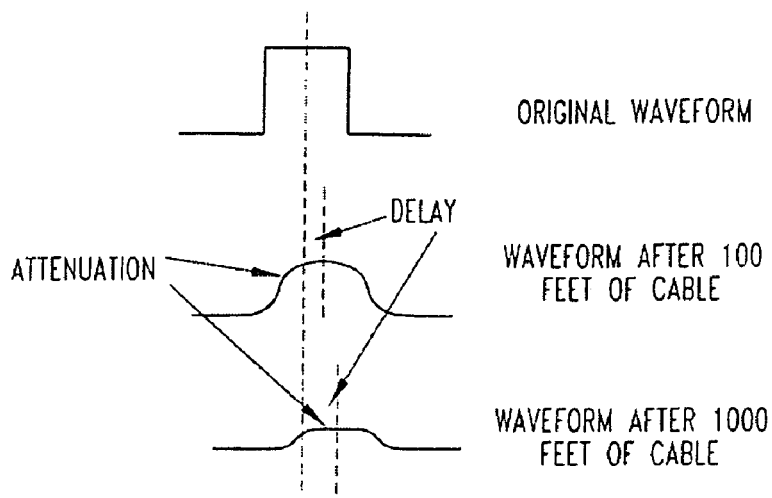
FIG. 3 illustrates attenuation and delay of a square wave.
Figure 4A:
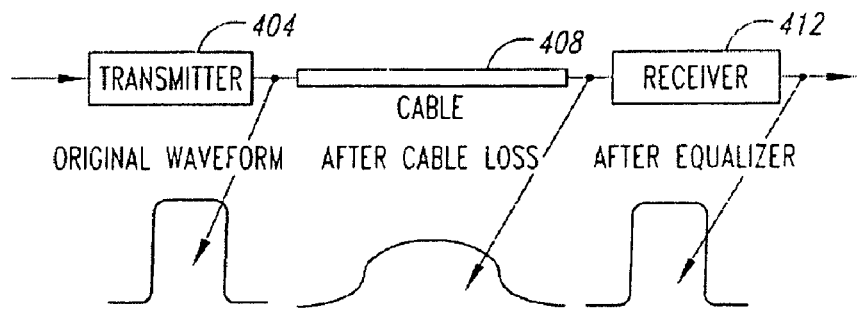
FIGS. 4(a) and 4(b) illustrate ideal equalization scenarios.
Figure 4B:
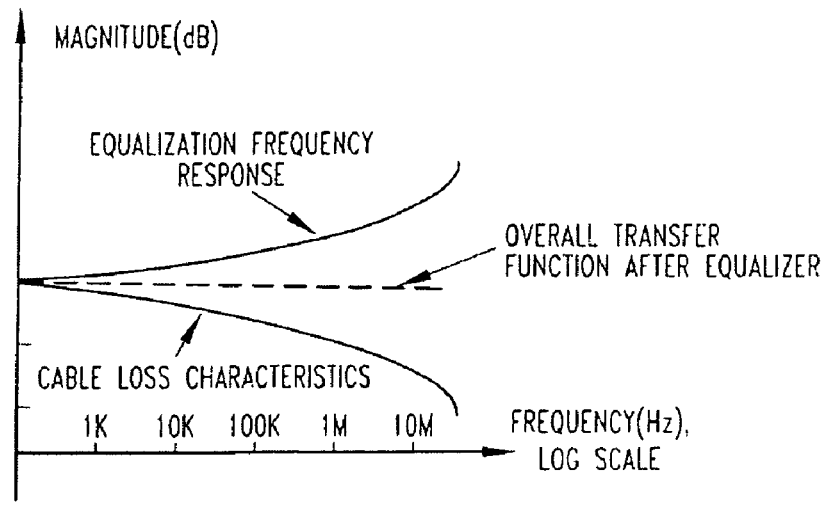
Figure 5A:
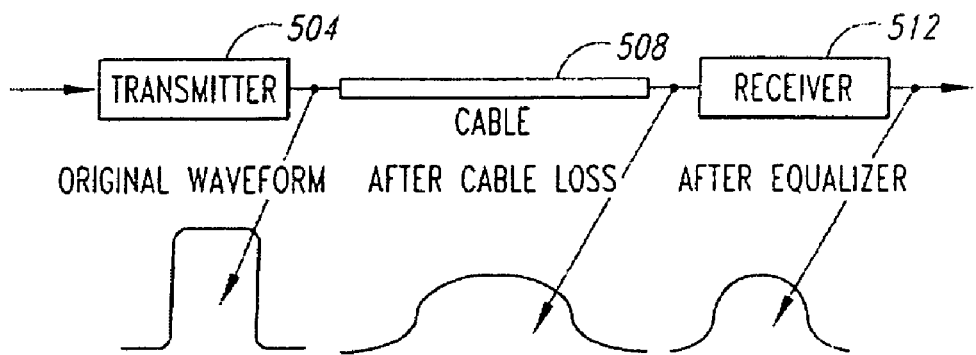
FIGS. 5(a) and 5(b) illustrate under equalization scenarios.
Figure 5B:
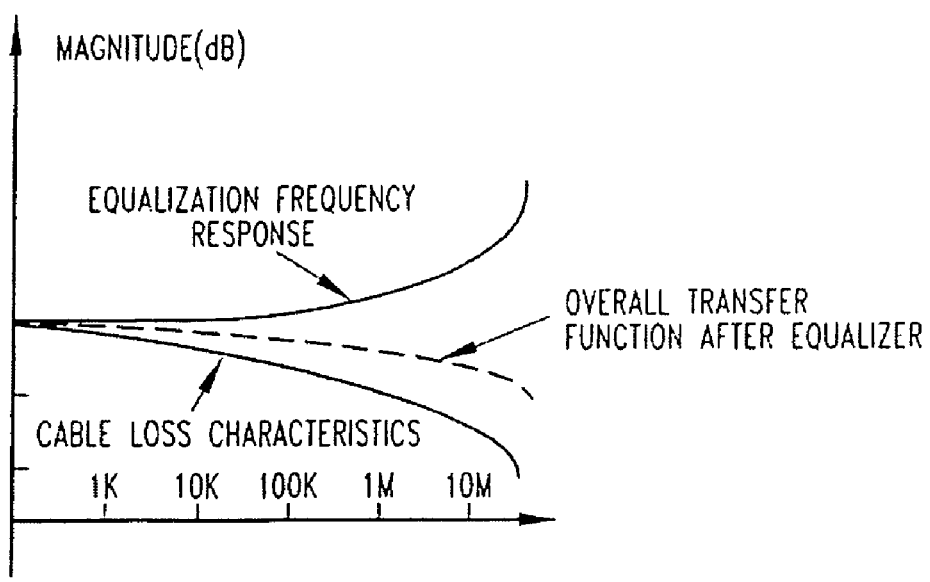
Figure 6A:
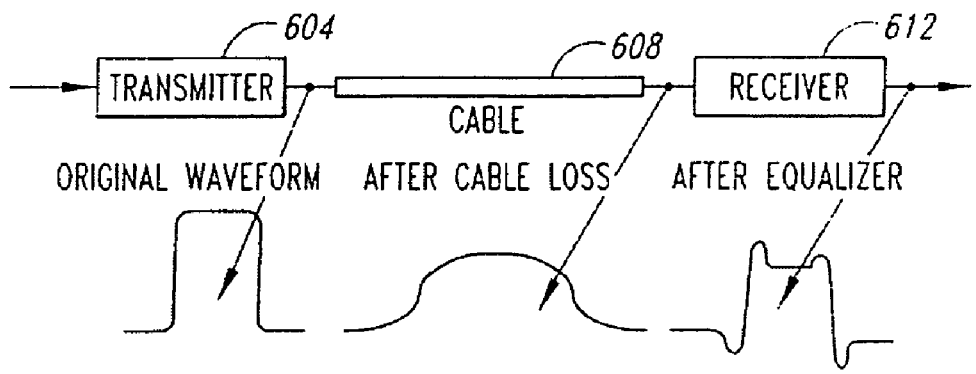
FIGS. 6(a) and 6(b) illustrate over equalization scenarios
Figure 6B:
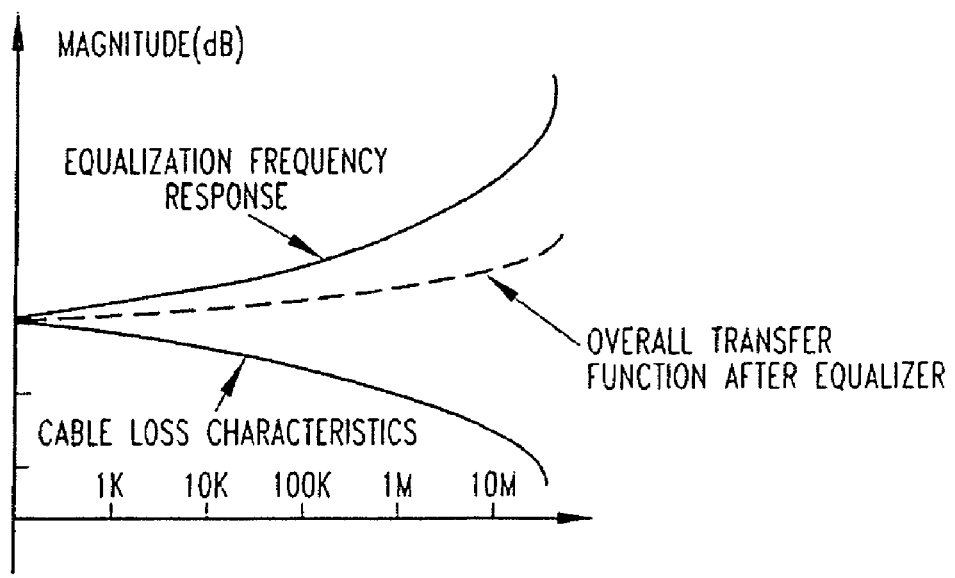
Figure 7A:
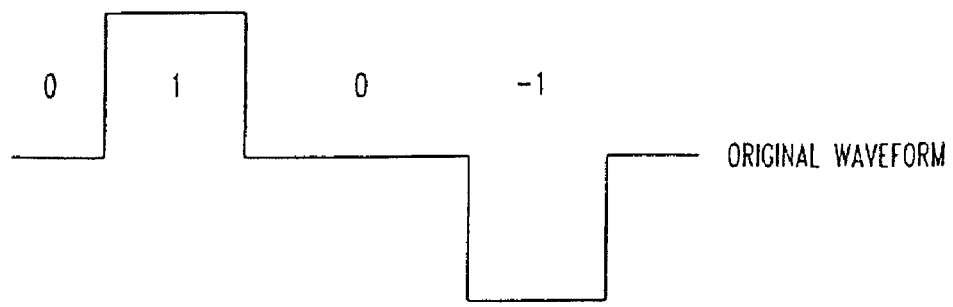
FIGS. 7(a)-7(c) illustrate over equalization problems.
Figure 7B:
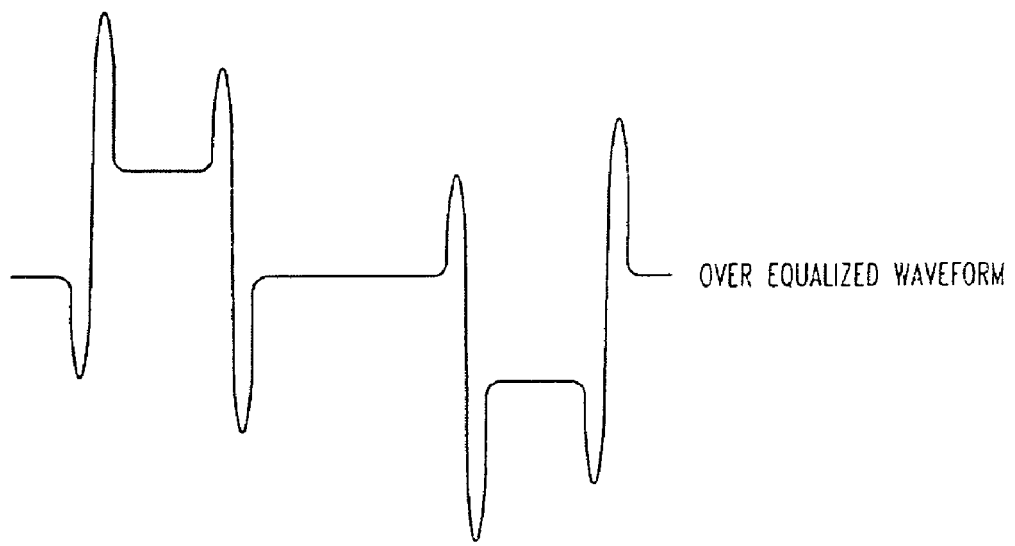
Figure 7C:
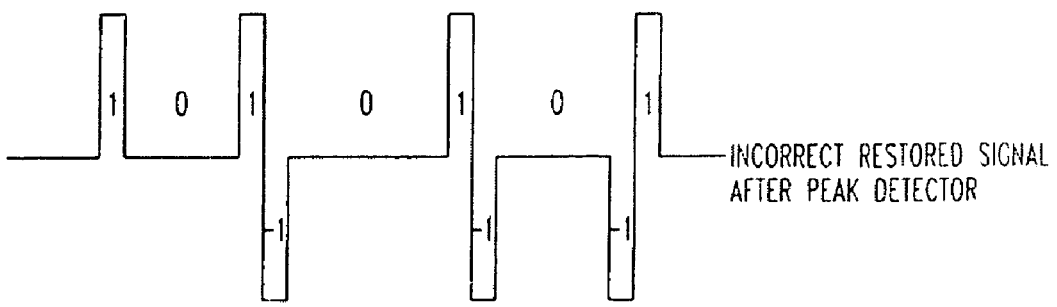
Figure 8A:
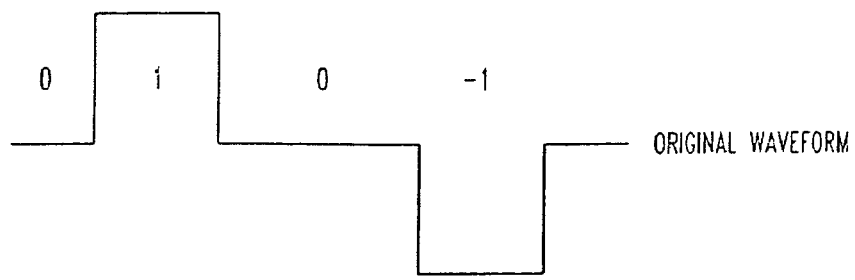
FIGS. 8(a)-8(c) illustrate under equalization problems.
Figure 8B:
Figure 8C:
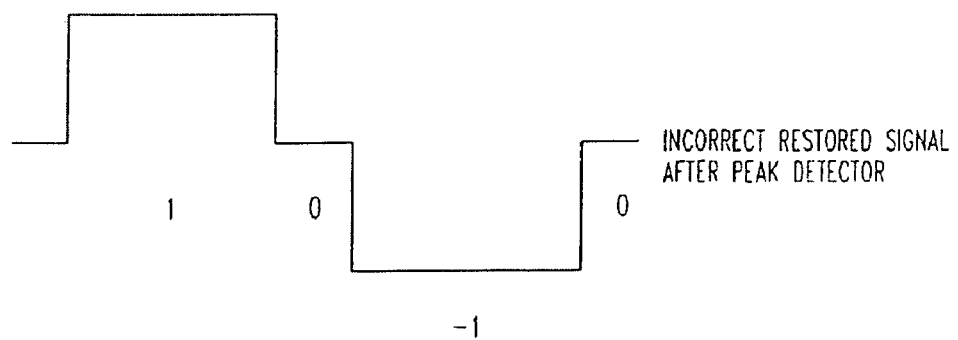
Figure 9A:
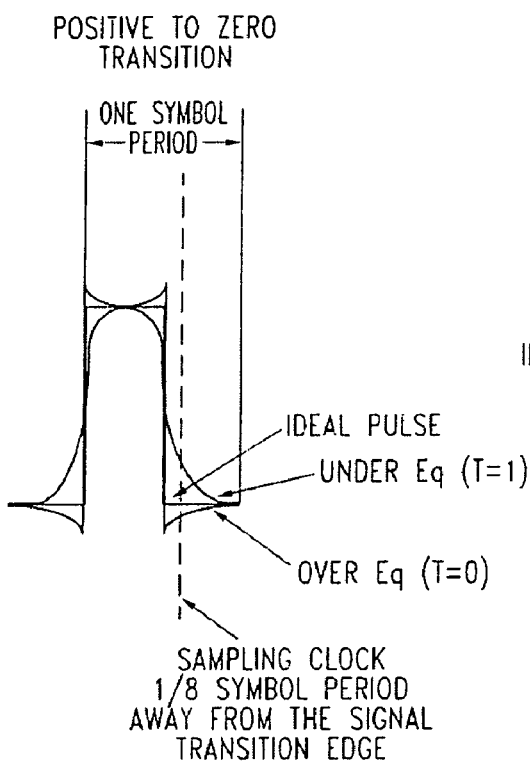
FIGS. 9(a) and 9(b) illustrate an algorithm for determining whether a signal is over or under equalized in accordance with one embodiment of the invention.
Figure 9B:
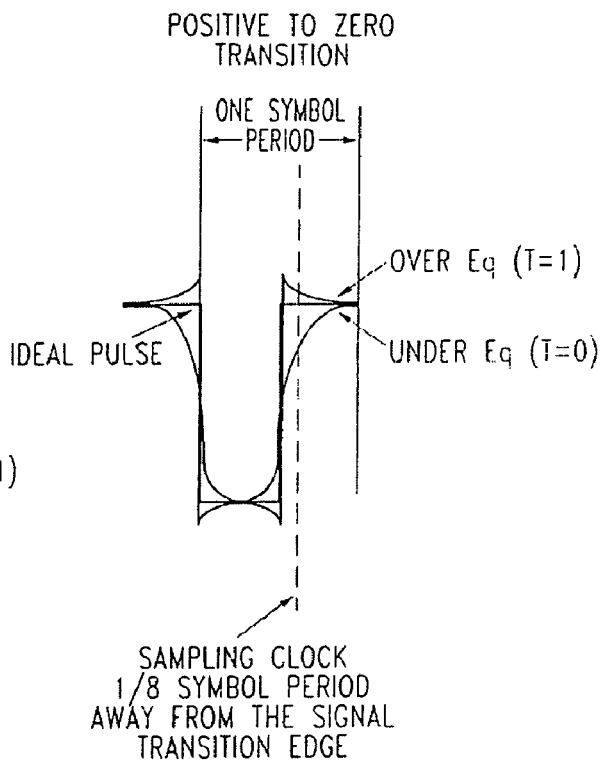

FIGS. 9(a) and 9(b) illustrate the algorithm for determining whether the signal is over or under equalized in accordance with one embodiment of the invention.

FIG. 9(a) illustrates a scenario where the signal transitions from positive to zero and there is no other transition in the next symbol period. If the signal transitions from positive to zero and the output of the 1-bit quantizer=1, the signal is under equalized. If the signal transitions from positive to zero and the output of the 1-bit quantizer=0, the signal is over equalized.

FIG. 9(b) illustrates a scenario where the signal transitions from negative to zero, and there is no other transition in the next symbol period. If the signal transitions from negative to zero and the 1-bit quantizer output=1, the signal is over equalized. If the signal transitions from negative to zero, and the 1-bit quantizer output=0, the signal is under equalized.

As discussed before, a counter is incremented by 1 if the signal is under equalized and decremented by 1 if the signal is over equalized. When the internal counter overflows, the equalizer coefficient is incremented by 1. When the internal counter underflows, the equalizer coefficient is decremented by 1. Thus, the algorithm waits until the counter overflows or underflows before adjusting the equalizer's coefficient value. The equalizer is not adjusted until the counter overflows or underflows in order to ensure that the signal is indeed under equalized or over equalized and also to prevent adjusting the equalizer's coefficient value because of random noise or interference.

Figure 10A:
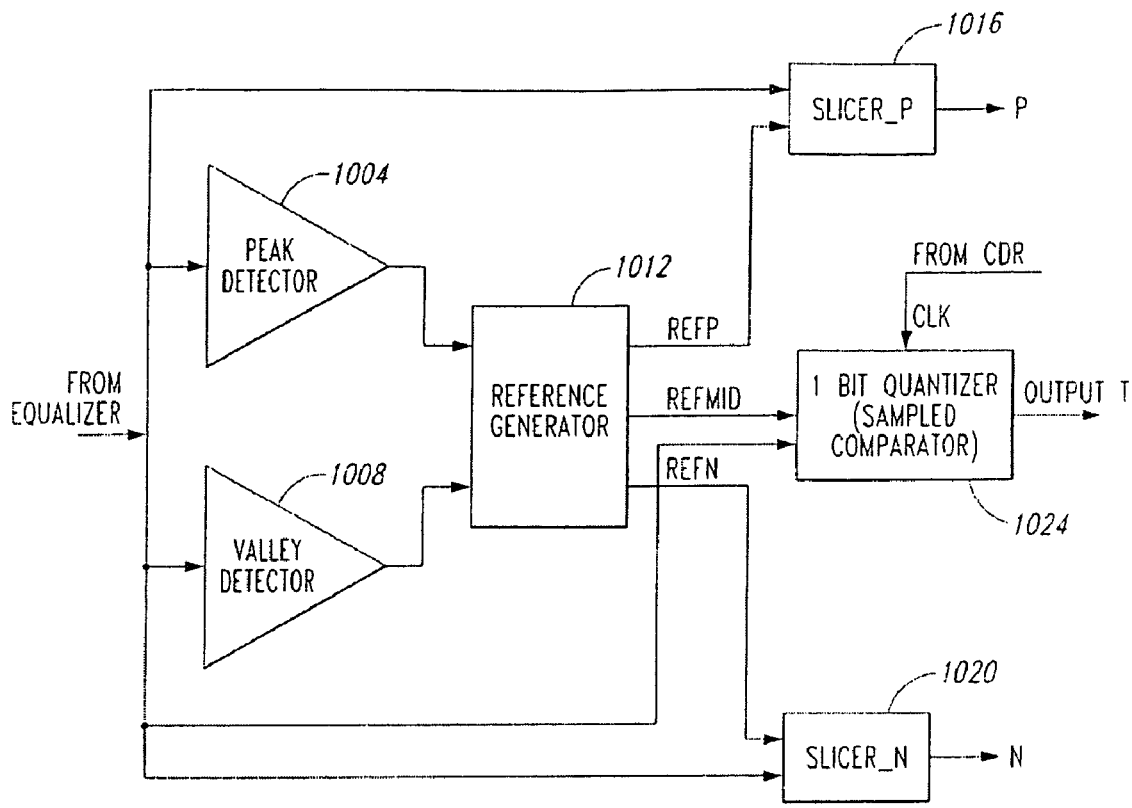
FIGS. 10(a) and 10(b) are functional block diagrams of components used to determine whether the signal is under equalized or over equalized.
Figure 10B:
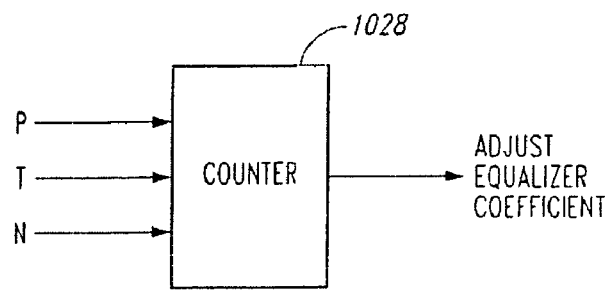

FIGS. 10(a) and 10(b) are functional block diagrams of components used to determine whether the signal is under equalized or over equalized. The components shown in FIGS. 10(a) and 10(b) are incorporated in a conventional receiver to implement the invention.

As shown in FIG. 10(a), an equalized signal is received at a peak detector 1004 and a valley detector 1008. The peak detector 1004 detects the most positive, i.e., highest, voltage level of the incoming signal, and the valley detector 1008 detects the most negative, i.e., lowest, voltage level of the incoming signal. The output of the peak detector 1004 and the output of the valley detector 1008 are provided to a reference generator 1012. The reference generator 1012 generates three output signals, REFP, REFMID and REFN. A slicer 1016 (also referred to as Slicer_p) compares the REFP signal to the equalized signal and outputs a signal P. A slicer 1020 (also referred to as Slicer_n) compares the REFN signal to the equalized signal and outputs a signal N. Slicer_p and Slicer_n are continuous time comparators that compare the equalized signal to the respective reference signal. Slicer_p recognizes its input as '1' if the signal amplitude is greater than REFP. Slicer_n recognizes its input as '1' if the signal amplitude is less than REFN.

The signals P and N are used to determine the transitions of the incoming signal. The signals P and N can have values of 1 or 0. In one embodiment, two samples of P and N are used to determine the transition of the incoming data or signal. If in a first sample if P=1 and N=0, the incoming data is considered to be 1. If in a second sample if P=0 and N=0, the incoming data is considered to be 0. At that time, a "1 0" transition has occurred.

If in a first sample P=0 and N=1, the incoming data is considered to be −1. If in a second sample, P=0 and N=0, the incoming data is considered to be 0. At that time, a "−1 0" transition has occurred.

REFMID is the mid point between the most positive and the most negative voltages. The REFMID is the common mode reference of the input signal.

The REFMID is provided to a 1-bit quantizer 1024. The 1-bit quantizer 1024 also receives the equalized signal and a clock signal CLK from the CDR. The 1-bit quantizer is a sampled comparator, which compares the REFMID signal to the equalized signal's tail settling voltage. The output T of the 1-bit quantizer is either 1 or 0.

The signals P, N and T are provided to a counter 1028 shown in FIG. 10(*b*). The counter 1028 is incremented according to the algorithm described before. When the counter 1028 underflows or overflows, the equalizer's coefficient value is incremented or decremented according to the algorithm described before.

One problem associated with the adaptive equalization scheme is its nonlinear behavior. The nonlinear behavior is caused by the equalizer loop's mixed signal content. The equalizer loop is formed by the equalizer, the PD, the slicer, the CDR and the AEC.

The adaptive equalizer loop includes an analog signal path. As discussed before, the equalizer receives the output from the VGA and equalizes the signal to compensate for the frequency dependent losses. The output signals of the VGA and the equalizer are analog signals thus forming the analog signal path. The adaptive equalizer loop also includes a digital feedback control path comprising the automatic equalizer control. The output of the automatic equalizer control is a digital signal that is used to adjust the equalizer coefficient. Also, the CDR is a mixed signal block that includes analog and digital signals. Thus, the analog and digital signals in the adaptive equalizer loop cause its nonlinear behavior.

The consequence of the nonlinear behavior is that the adaptive equalizer loop's settling behavior is dependent on the initial state. If the loop is initialized with an erroneous state, it may be trapped in the erroneous or failure state and not be able to recover from it.

In one embodiment of the invention, when the receiver is initially powered up, the AOC loop converges at time 3*TAOC, TAOC being the loop time constant of the AOC. In an embodiment of the invention, the TAOC is approximately 125 μs. The AGC loop settles at time 3*TAGC, TAGC being the loop time constant of the automatic gain control loop. In one embodiment, the TAGC is 335 μs. At a time period equal to 3*TAOC+3TAGC, the VGA gain is latched in and the equalizer is initialized. In an embodiment of the invention, the time period 3* TAOC+3*TAGC is approximately 1.5 ms. The equalizer is initialized using a common criteria such as, for example, a small signal amplitude corresponds to a heavily attenuated signal over a long distance.

The higher the VGA's gain (which corresponds to a smaller input signal amplitude), the higher the equalizer initial value. A longer cable causes more attenuation and thus the incoming signal will have a smaller amplitude. Thus, a longer cable causes the VGA to have a higher gain and correspondingly a higher equalizer initial value.

Next, the CDR requires a time TPLL, which is the loop time constant of the filter inside the PLL, to lock onto the data. In one embodiment of the invention, the TPLL is 300 us. If during TPLL period the CDR is able to lock onto the data, then the automatic equalizer controller is allowed to adaptively change the equalizer coefficients. Thus the equalizer is provided with an initial value and is then monitored during the TPLL to determine if the initial value is correct or not. If within TPLL the CDR is able to lock onto the data, it is determined that the initial value is correct, and the equalizer is subsequently controlled by the AEC.

If the CDR is unable to lock onto the data during TPLL, the equalizer coefficient range is searched for an initial value that will allow the CDR to lock onto the signal, i.e., the CDR converges. In general, the equalizer coefficient range has N bits. In one embodiment, the equalizer coefficient range has N=8 bits, which corresponds to a range of 0 to 255. The search for an initial value ends if a proper initial equalizer coefficient is found. If a proper initial equalizer coefficient is not found after searching the equalizer coefficient range, a failure is declared. If a failure is declared, the CDR is said to have not converged. At that time, the receiver channel is reset and the process restarts.

In one embodiment of the invention, if the CDR converges within an initial period of 3*TAOC+3*TAGC1.5 ms)+TPLL (300 us)=1.8 ms, the CDR output is still monitored. If a CDR failure is declared, the search algorithm is restarted. This scheme is robust, allowing the receiver channel to recover from a catastrophic failure such as a user unplugging the cable on the fly or changing to another cable of a different length.

As discussed before, the algorithm waits for TPLL for the CDR to lock onto the incoming signal. The TPLL wait period is due to the fact that the equalizer relies on the extracted clock to sample the tail settling voltage of a "1" to "0" or "−1" to "0" transition. However, the CDR also relies on the equalizer to correctly restore the signal so that the CDR can extract the correct timing. Thus the CDR and the equalizer are mutually dependent and rely on each other to function properly.

Since the CDR and the equalizer are mutually dependent and rely on each other to perform properly, a non-linear closed loop system is created. The receiver channel can easily be locked up in a failure state because of the nonlinear closed loop system, and the receiver channel may be unable to recover from the failure state.

For example, an incorrect initial state will cause the CDR to fail to lock onto the incoming signal and instead cause the CDR to lock onto a failure state. If the CDR is locked onto to a failure state, the CDR will extract an invalid clock signal from the incoming signal. The invalid clock signal will cause error in the 1-bit quantizer's output, causing the adaptive algorithm to fail.

According to one embodiment of the invention, the adaptive equalization loop is initialized according to the VGA's gain code after the analog gain control loop settles. A large VGA gain corresponds to a small input signal, which means large attenuation by the cable. If there is a large cable attenuation, the equalizer is initialized to a high value.

It is to be understood that even though various embodiments and advantages of the present invention have been set forth in the foregoing description, the above disclosure is illustrative only, and changes may be made in detail, and yet remain within the broad principles of the invention. For example, the components shown in FIGS. 10(a) and 10(b) can be substituted by other circuitry to perform the operations of FIGS. 9(a) and 9(b). Therefore, the present invention is to be limited only by the appended claims.

What is claimed is:

1. An adaptive equalization system for automatically adjusting an equalizer to compensate a signal's frequency dependent loss comprising:
    a first detector circuit adapted to receive an equalized signal and operable responsive to the highest voltage level of the equalized signal to generate a first output signal;
    a second detector circuit adapted to receive the equalized signal and operable responsive to the lowest voltage level of the equalized signal to generate a second output signal;
    a reference generator adapted to receive the first and second output signals and operable responsive to the first and second output signals to generate a third and fourth output signals and a common mode reference signal;
    a first slicer adapted to receive the equalized signal and the third signal, and operable to generate a signal P;
    a second slicer adapted to receive the equalized signal and the fourth signal, and operable to generate a signal N; and
    a comparator circuit adapted to receive the common mode reference signal, the equalized signal and a clock signal, and operable responsive to a settling voltage of the equalized signal to generate a signal T, wherein the signals P, N and T are used to determine whether the signal is under equalized or over equalized.

2. The adaptive equalization system of claim 1 further comprising a counter adapted to receive the signals P, N and T, wherein the counter is incremented or decremented based on the signals P, N and T.

3. The adaptive equalization system of claim 2 wherein the equalizer's coefficient value is adjusted based on the counter value.

4. The adaptive equalization system of claim 2 wherein the equalizer's coefficient value is adjusted when the counter overflows or underflows.

5. The adaptive equalization system of claim 1 wherein the signals P and N indicate the transition of the equalized signal.

6. A receiver comprising:
    a variable gain amplifier;
    an equalizer;
    a peak detector and slicer;
    an analog offset control circuit;
    a clock and data recovery circuit;
    an analog gain control circuit;
    an automatic equalizer control circuit;
    a digital decoder; and
    an adaptive equalization system for automatically adjusting the equalizer to compensate a signal's frequency dependent loss comprising:
    a first detector circuit adapted to receive an equalized signal and operable responsive to the highest voltage level of the equalized signal to generate a first output signal;
    a second detector circuit adapted to the receive the equalized signal and operable responsive to the lowest voltage level of the equalized signal to generate a second output signal;
    a reference generator adapted to receive the first and second output signals and operable responsive to the first and second output signals to generate third and fourth output signals and a common mode reference signal;
    a first slicer adapted to receive the equalized signal and the third signal, and operable to generate a signal P;
    a second slicer adapted to receive the equalized signal and the fourth signal, and operable to generate a signal N; and
    a comparator circuit adapted to receive the common mode reference signal, the equalized signal and a clock signal, and operable responsive to a settling voltage of the equalized signal to generate a signal T, wherein the signals P, N and T are used to determine whether the signal is under equalized or over equalized.

7. The receiver of claim 6 further comprising a counter adapted to receive the signals P, N and T, wherein the counter is incremented or decremented based on the signals P, N and T.

8. The receiver of claim 7 wherein the equalizer's coefficient value is adjusted based on the counter value.

9. The receiver of claim 7 wherein the equalizer's coefficient value is adjusted if the counter overflows or underflows.

10. The receiver of claim 6 wherein the signals P and N indicate the transition of the equalized signal.

* * * * *